US010389611B2

(12) United States Patent
Szabo et al.

(10) Patent No.: US 10,389,611 B2
(45) Date of Patent: Aug. 20, 2019

(54) INSERTING AND REMOVING STATEFUL DEVICES IN A NETWORK

(71) Applicant: F5 Networks, Inc., Seattle, WA (US)

(72) Inventors: Paul Imre Szabo, Shoreline, WA (US); Peter Michael Thornewell, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 78 days.

(21) Appl. No.: 15/389,309

(22) Filed: Dec. 22, 2016

(65) Prior Publication Data

US 2017/0201444 A1    Jul. 13, 2017

Related U.S. Application Data

(60) Provisional application No. 62/387,122, filed on Dec. 23, 2015.

(51) Int. Cl.
*H04L 12/26* (2006.01)
*H04L 29/06* (2006.01)
*H04L 12/823* (2013.01)

(52) U.S. Cl.
CPC ........ *H04L 43/0876* (2013.01); *H04L 43/028* (2013.01); *H04L 43/12* (2013.01); *H04L 47/32* (2013.01); *H04L 67/42* (2013.01)

(58) Field of Classification Search
CPC ..... H04L 43/0876; H04L 47/32; H04L 67/42; H04L 12/26; H04L 12/823
See application file for complete search history.

(56) References Cited

U.S. PATENT DOCUMENTS

| 7,881,215 | B1 * | 2/2011 | Daigle | H04L 67/142 |
| | | | | 370/252 |
| 9,660,879 | B1 * | 5/2017 | Rothstein | H04L 43/026 |
| 2004/0131059 | A1 * | 7/2004 | Ayyakad | H04L 45/60 |
| | | | | 370/389 |
| 2005/0041592 | A1 * | 2/2005 | Hannel | H04L 41/145 |
| | | | | 370/241 |
| 2011/0196971 | A1 | 8/2011 | Reguraman et al. | |

(Continued)

OTHER PUBLICATIONS

International Search Report and Written Opinion for International Application No. PCT/US2016/063445 dated Apr. 12, 2017, 11 pages.

(Continued)

*Primary Examiner* — Charles C Jiang
*Assistant Examiner* — Kyaw Z Soe
(74) *Attorney, Agent, or Firm* — John W. Branch; Lowe Graham Jones PLLC

(57) ABSTRACT

Embodiments are directed to managing communication over a network with traffic management computers (TMCs). If network traffic that is statelessly monitored is selected for stateful monitoring, the TMCs may perform operations to transition from stateless monitoring to stateful monitoring with minimal disruption of users/clients. TMCs may receive the network traffic that include network packets. If the network packets are statelessly monitored by the TMCs one or more stateless network management operations may be performed on the network packets. If the network packets may be statefully monitored the TMCs may perform stateful network management operations on the network packets.

20 Claims, 7 Drawing Sheets

(56) References Cited

U.S. PATENT DOCUMENTS

| | | |
|---|---|---|
| 2013/0139243 A1 | 5/2013 | Poola et al. |
| 2013/0212298 A1* | 8/2013 | Bunch .................... H04L 45/42 |
| | | 709/244 |
| 2014/0269777 A1* | 9/2014 | Rothstein ............ H04L 43/0823 |
| | | 370/503 |
| 2015/0039671 A1 | 2/2015 | Jalan et al. |
| 2015/0358288 A1 | 12/2015 | Jain et al. |

OTHER PUBLICATIONS

F5 Networks, Inc., "Deploying the BIG-IP Dual-Stack Data Center Firewall with F5 Advanced Firewall Manager," https://www.f5.com/pdf/deployment-guides/f5-data-center-firewall-dg.pdf, Last Update Feb. 5, 2016, 74 pages.

* cited by examiner

US 10,389,611 B2

INSERTING AND REMOVING STATEFUL DEVICES IN A NETWORK

CROSS-REFERENCE TO RELATED APPLICATIONS

This application is a Utility Patent application based on a previously filed U.S. Provisional Patent Application U.S. Ser. No. 62/387,122 filed on Dec. 23, 2015, the benefit of the filing date of which is hereby claimed under 35 U.S.C. § 119(e) and which is further incorporated by reference in its entirety.

TECHNICAL FIELD

The present innovations relate generally to packet traffic management and, more particularly, but not exclusively to managing the transition between monitoring network connections using stateless devices and stateful devices.

BACKGROUND

The expanded use of the Internet has increased communication connections between client devices and server devices. Often, a client device establishes a network connection with a server device by using well-known protocols, such as Transmission Control Protocol/Internet Protocol (TCP/IP), User Datagram Protocol (UDP), and the like. This network connection may be identified by one characteristic or a combination of characteristics, such as a source port, a destination port, a source address, a destination address, a protocol, and the like. Typically, the source address, destination address, destination port, and protocol are relatively fixed for a network connection between a client device and a server device. In some cases, network traffic managers may statelessly monitor/manage some or all of the network connections between the clients and servers. Further, sometimes, network connections flows may need to be transitioned from stateless monitoring to stateful monitoring (and back again). Switching between stateless and stateful monitoring may require disrupting client-server communications because the connections may need to be reset/terminated to make the change. It is with respect to these considerations and others that the subject innovations have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Description of Various Embodiments, which is to be read in association with the accompanying drawings, wherein.

DESCRIPTION OF VARIOUS EMBODIMENTS

Figure 1:
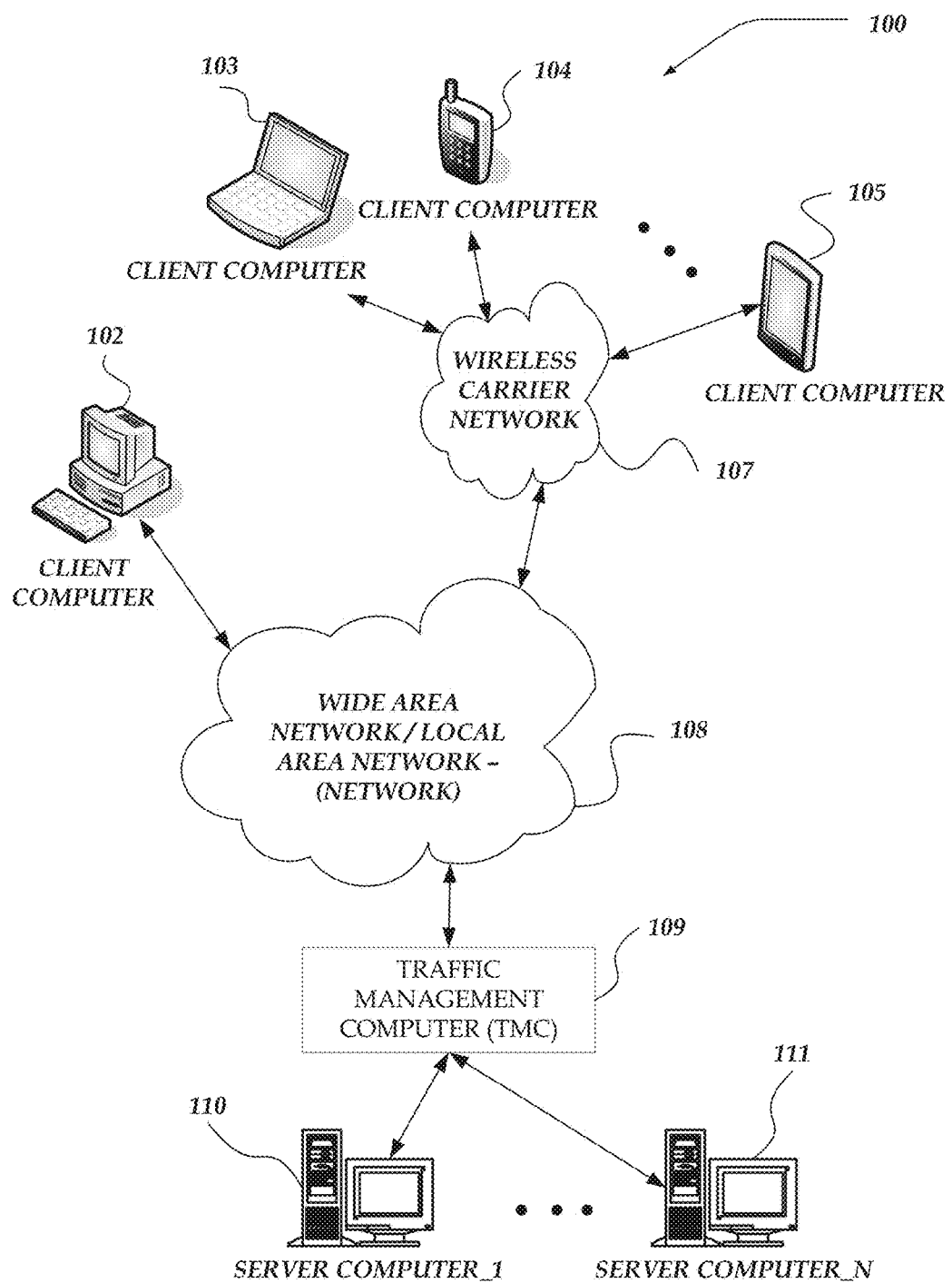
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to key that may be generated based on a tuple comprising any combination of fields selected from within a network packet header, including those fields identified above.

As used herein, the terms "network flow," "connection flow,", "flow" may refer to a network session established between two endpoints. In at least one of the various embodiments, a tuple may describe the flow. In at least one of the various embodiments, flow routing data associated with connection flows may be used to ensure that the network packets sent between the endpoints of a connection flow may be routed along the same path. Network packets may be associated with network flows by comparing the tuple information of the network packets with the tuple information of the network flows.

As used herein the terms "network destination," or "network address" refer to a name or number used to identify one or more items, objects, services, and/or locations in a communication network. In some cases, the network destination and/or network address may represent a single unique endpoint on the network. In other cases, the network destination and/or network address may represent of one or more endpoints each sharing one or more similar network communication attributes and/or characteristics. In at least one of the various embodiments, the elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations.

As used herein the term "network traffic" refers to data and/or information that is communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein the term "policy rule" refers to conditions and actions that may be paired together such that if a condition is met then the corresponding action may be executed. In at least one of the various embodiments, conditions may be compound conditions comprised of multiple conditions. In at least one of the various embodiments, actions may also be compound actions, or in other words, multiple actions may be associated with a condition and/or a policy rule. Policy rules may be arranged perform various network traffic management actions on network traffic, such as, load balancing, network flow steering, firewalling, modifying traffic data, enforcing security, caching, compression, decompression, cryptographic operations, proxying, traffic routing, traffic switching, bandwidth shaping, quota tracking, or the like.

As used herein the term "policy" refers to a plurality of policy rules grouped together based on reasons, such as, semantic similarity, domain similarity, or the like. In at least one of the various embodiments, policy rules may be grouped into policies for any arbitrary reason to support the network management goals of a user/administrator of a traffic management device.

As used herein the term "stateful monitoring" refers to network traffic monitoring that maintains an ongoing record of the state of a communication with respect to one or more network/application protocols. The network packets may be compared to a known or expected state of the communication transaction. For example, if network protocol defines a particular multi-step handshake, stateful monitoring may be used to track whether the expected responses are provided. If network packets are received out of order it may indicate that the associated network flow may be broken or malicious. Absent stateful monitoring that monitoring device may be unable to determine if protocol message are received out of order.

Also, in at least one of the various embodiments, stateful monitoring may also imply other enhanced monitoring techniques, such as, packet inspection, endpoint proxying, or the like, or combination thereof.

As used herein the term "stateless monitoring" refers to network traffic monitoring that does not maintain a running state of the communication, and/or compare received network packets to an expected state condition. In some embodiments, stateless monitoring may be referred to as bump-on-wire monitoring, where the stateless monitoring devices act as endpoints of the communication nor do they perform deep packet inspection, or other enhanced monitoring.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing communication over a network with one or more traffic management computers (TMCs). In at least one of the various embodiments, if network traffic that is being statelessly monitored is selected for stateful monitoring, perform by a processor on the one or more TMCs further operations to transition for stateless monitoring to stateful monitoring with minimal disruption of users/clients. In at least one of the various embodiments, a first processor on the one or more TMCs may receive the network traffic that includes one or more network packets.

In at least one of the various embodiments, if the one or more network packets may be statelessly monitored by the one or more TMCs, a second processor on the one or more TMCs may perform one or more stateless network management operations on the one or more network packets. In at least one of the various embodiments, the one or more stateless network management operations may include, if the one or more network packets may be initializing-packets of a network protocol, stateful monitoring of the one or more network packets may begin. In at least one of the various embodiments, the one or more stateless network management operations, may further include, discarding the one or more network packets. And, in at least one of the various embodiments, the one or more stateless network management operations, may include, providing the one or more network packets to their intended destination.

In at least one of the various embodiments, if network traffic that is statefully monitored may be selected for stateless monitoring, one or more processors on the one or more TMCs may perform one or more network management operations that route the network traffic to one or more network monitoring computers for stateless monitoring.

In at least one of the various embodiments, if the one or more network packets may be statefully monitored, a third processor on the one or more TMCs may perform one or more stateful network management operations on the one or more network packets.

In at least one of the various embodiments, the first processor, the second processor, and the fourth processor of the one or more TMCs may be the same processor.

In at least one of the various embodiments, at least one of the first processor, the second processor, the third processor, or the like may be on the same TMC.

Illustrated Operating Environment

FIG. 1 shows components of one embodiment of an environment in which the invention may be practiced. Not all of the components may be required to practice these innovations, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client computers 102-105, traffic management computer (TMC) 109, and server computers 110-111. Network 108 is in communication with and enables communication between client computers 102-105, wireless network 107, and TMC 109. Wireless network 107 further enables communication with wireless devices, such as client computers 103-105. TMC 109 is in communication with network 108 and server computers 110-111.

One embodiment of client computers 102-105 is described in more detail below in conjunction with FIG. 2. In one embodiment, at least some of client computers 102-105 may operate over wired and/or a wireless networks, such as networks 107 and/or 108. Generally, client computers 102-105 may include virtually any computing device, or computer capable of communicating over a network. It should be recognized that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computing computer, or computer, capable of connecting to another computing device, or computer and communicating information, such as laptop computers, smart phones, mobile computers, tablet computers, or the like. However, client computers are not so limited and may also include other portable devices, such as cellular telephones, display pagers, radio frequency ("RF") devices, infrared ("IR") devices, Personal Digital Assistants ("PDAs"), wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client computer may employ the browser application to perform various activities over a network (online). However, another application resident on the client computer may also be used to perform various online activities.

Client computers 102-105 also may include at least one other client application that is configured to communicate by receiving and/or sending data with one or more other computing devices and/or computers. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, network address, MAC address, Mobile Identification Number ("MIN"), an electronic serial number ("ESN"), or other mobile device identifier. The information may also indicate a content format that the client computer is enabled to employ. Such information may be provided in a network packet, or the like, sent between other client computers, TMC 109, server computers 110-111, or other computing devices.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 107 is configured to couple client computers 103-105 and its components with network 108. Wireless network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 107 may include virtually any wireless communication mechanism by which information may travel between client computers 103-105 and another computing device, computer, network, and the like.

Network 108 is configured to couple network computers with other computing devices, and/or computers, including, server computers 110-111 through TMC 109, client computer 102, and client computers 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices and/or computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TMC 109 is described in more detail below in conjunction with FIG. 3. Briefly, however, TMC 109 may include virtually any network computer capable of managing network traffic between client computers 102-105 and server computers 110-111. Such computers include, for example, routers, proxies, firewalls, load balancers, cache devices, devices that perform network address translation, or the like, or any combination thereof. TMC 109 may perform the operations of routing, translating, switching packets, network address translation, firewall services, network flow routing, or the like. In one embodiment, TMC 109 may inspect incoming network packets, and may perform an address translation, port translation, a packet sequence translation, and the like, and route the network packets based, at least in part, on the packet inspection. In some embodiments, TMC 109 may perform load balancing operations to determine a server computer to direct a request. Such load balancing operations may be based on network traffic, network topology, capacity of a server, content requested, or other traffic distribution mechanisms.

TMC 109 may be arranged to perform hardware-optimized operations that perform statistics gathering, per-packet policy enforcement (e.g., packet address translations), high-speed flow caches, or the like, on managed connection flows between client computers, such as client computers 102-105, and server computers, such as server computers 110-111.

Server computers 110-111 may include virtually any network computer that may operate as a website server. However, server computers 110-111 are not limited to website servers, and may also operate as messaging server, a File Transfer Protocol (FTP) server, a database server, content server, application server, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates TMC 109 and server computers 110-111 as single computers, the invention is not so limited. For example, one or more functions of each of TMC 109 or server computers 110-111 may be distributed across one or more distinct network computers. Moreover, TMC 109 or server computers 110-111 are not limited to a particular configuration such as the one shown in FIG. 1. Thus, in one embodiment, TMC 109 or server computers 110-111 may be implemented using a plurality of network computers. In other embodiments, server computers may be implemented using a plurality of network computers in a cluster architecture, a peer-to-peer architecture, or the like. Further, in at least one of the various embodiments, TMC 109 or server computers 110-111 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
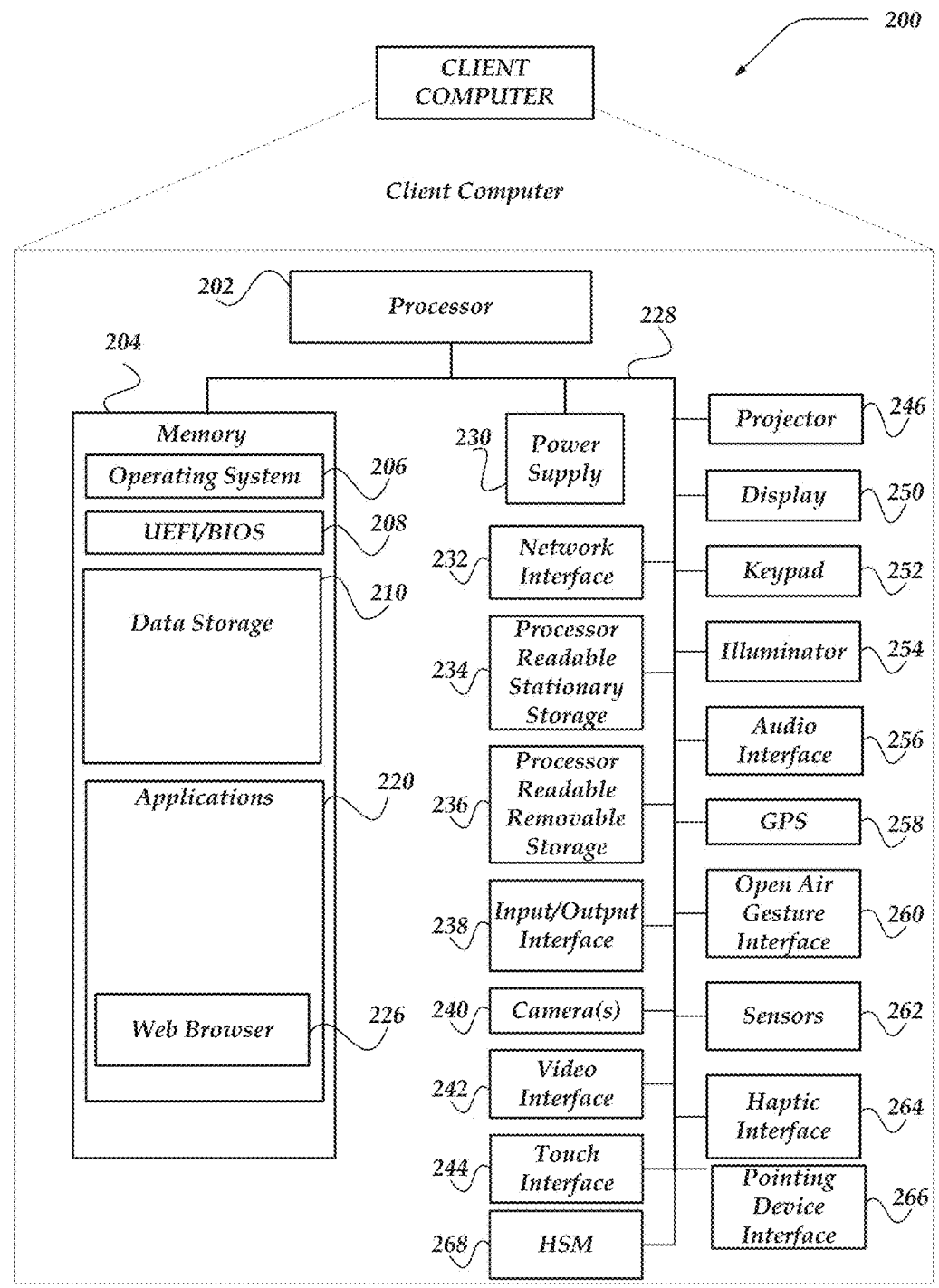
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as processor 202 in communication with memory 204 via bus 228. In some embodiments, the one or more processors may each include one or more processing cores. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, sensors interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keypad 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store UEFI/BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, Android Operating System, or Apple's IOS operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer. Applications 220 may include computer executable instructions which, when executed by client computer 200, transmit, receive, and/or otherwise process instructions and data, such as, establishing secure communication sessions with TMC 109 and/or other servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In at least one of the various embodiments, applications, such as, web browser 226, other applications, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 258. Also, in some embodiments, geolocation information may include information providing using one or more geo-location protocols over the networks, such as, wireless network 108 and/or network 111.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
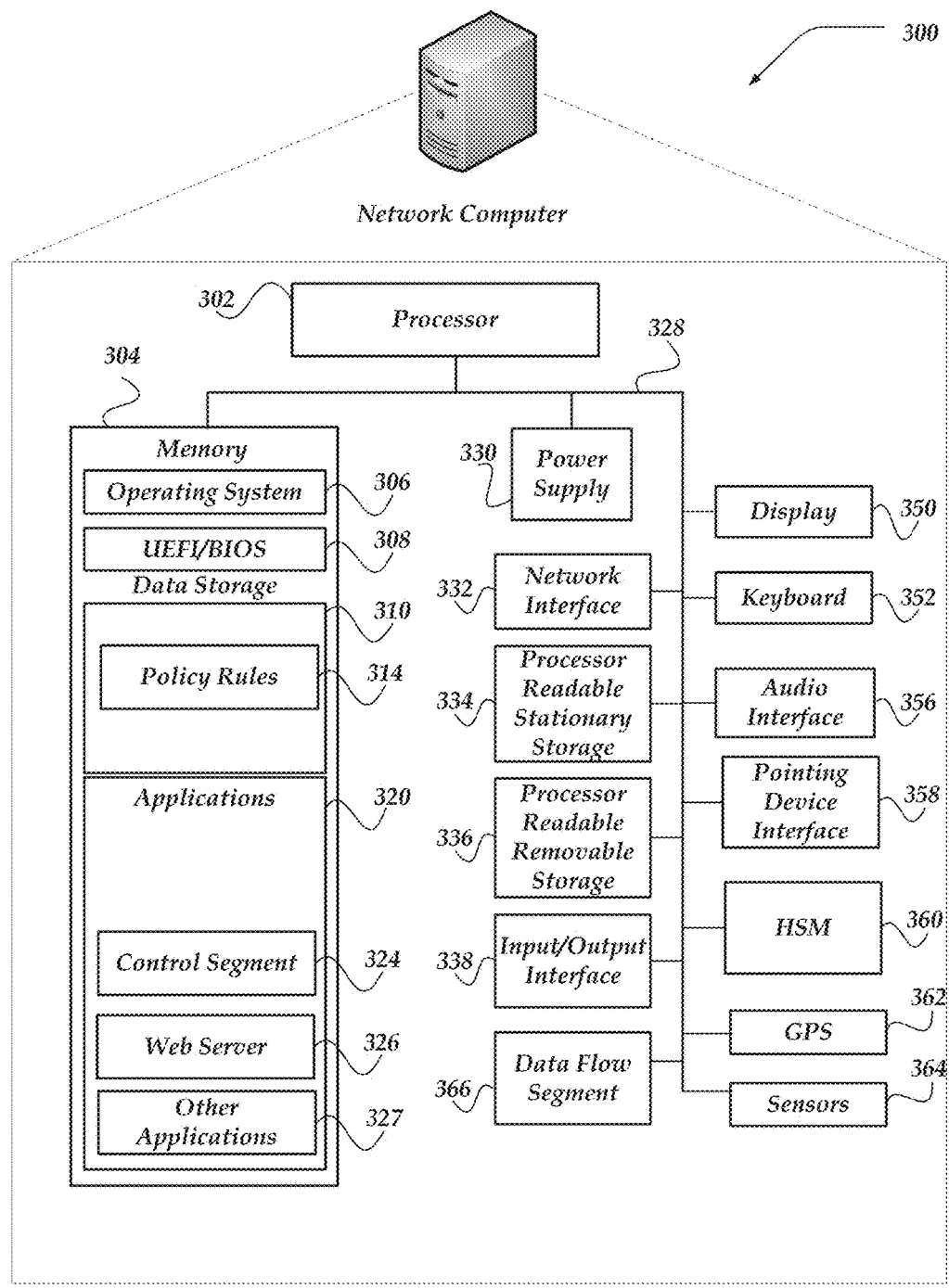
FIG. 3 shows an embodiment of a network computer that may be included in a system such as that shown in FIG. 1.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of traffic management computer (TMC) 109 of FIG. 1.

As shown in the figure, network computer 300 includes one or more processors, such as, processor 302 in communication with a memory 304 via a bus 328. In some embodiments, one or more of the one or more processors may include one or more processing cores. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components may be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), non-transitory, and/or other types of memory. Memory 304 illustrates an example of computer-readable storage media (devices) for storage of information such as computer-readable instructions, data structures, program modules or other data. Memory 304 stores a unified extensible firmware interface and/or basic input/output system and/or (UEFI/BIOS) 308 for controlling low-level operations of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, policy rules 314, or the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include, control segment 324, web server application 326, other applications 327, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, control segment 324, web server application 326, other applications 327, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocols over the networks, such as, wireless network 108 and/or network 111.

Furthermore, in at least one of the various embodiments, control segment 324 may be operative in a cloud-based computing environment. In at least one of the various embodiments, these applications, and others, that comprise the management platform may be executing within virtual machines and/or virtual servers that may be managed in a cloud-based based computing environment. Also, in at least one of the various embodiments, control segment 324, or the like, may be located in virtual servers running in a cloud-based computing environment rather than being tied to one or more specific physical network computer.

Also, in at least one of the various embodiments, control segment 324 may be running in one or more virtual machines (VM's) executing on network computer 300. In at least one of the various embodiments, virtual machines running on network computer 300 may be managed and/or supervised by a hypervisor.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Network computer 300 may also include DFS 366 for maintaining connection flows between client computers, such as client computers 102-105 of FIG. 1, and server computers, such as server computers 110-111 of FIG. 1. In one embodiment, DFS 366 may include hardware-optimized operations for packet traffic management, such as repetitive operations associated with packet traffic management. For example, DFS 366 may perform statistics gathering, per-packet policy enforcement (e.g., packet address translations), or the like, on connection flows maintained at DFS 366. In some embodiments, DFS 366 may route, switch, forward, and/or otherwise direct packets based on policy rules for a particular connection flow signature (e.g., a 5 tuple of a received packet). Thus, DFS 366 may include capabilities and perform tasks such as that of a router, a switch, a routing switch, firewalls, network address translation, or the like. In at least one of the various embodiments, components of DFS 366 may comprise and/or work in combination to provide high-speed flow caches for optimizing packet traffic management.

Additionally, in one or more embodiments (not shown in the figures), network computer 300 may include an embedded logic hardware device instead of a CPU (e.g., a hardware processor), such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4A:
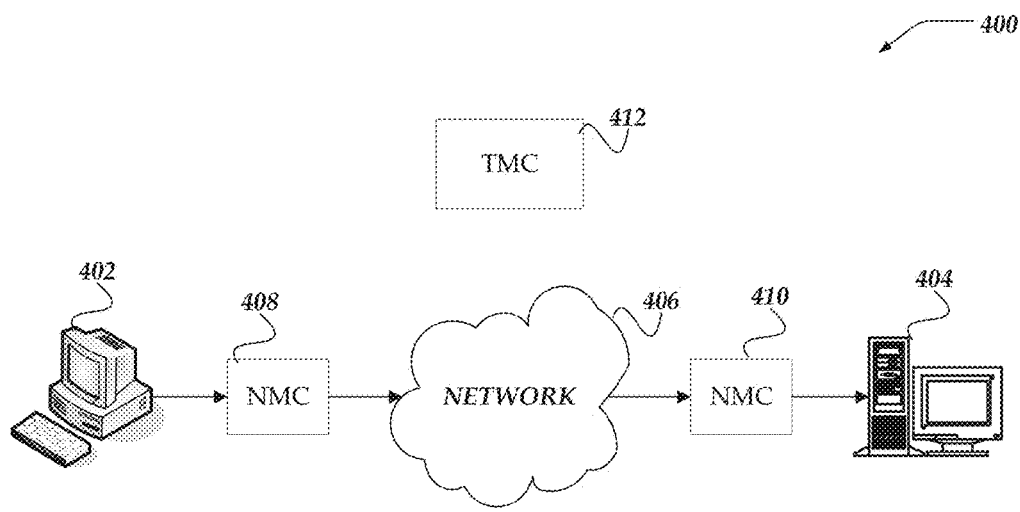
FIGS. 4A and 4B represent a portion of a logical system for inserting and removing stateful devices in a network in accordance with at least one of the various devices.
Figure 4B:
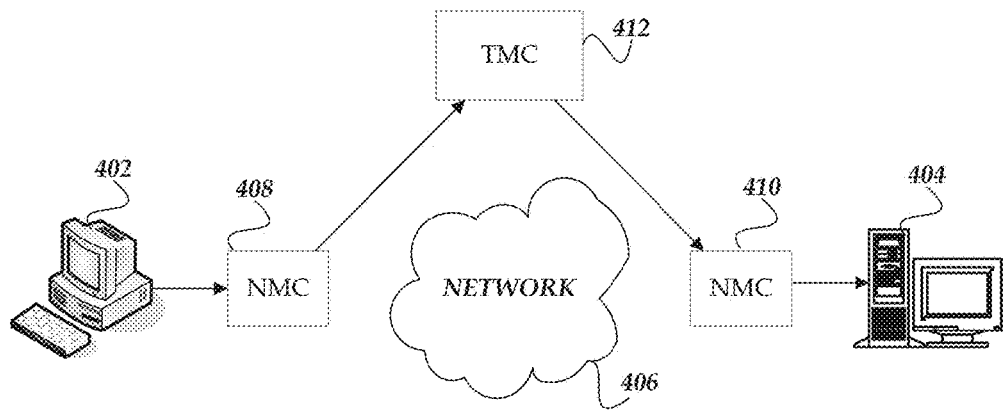

FIGS. 4A and 4B represent a portion of logical system 400 for inserting and removing stateful devices in a network in accordance with at least one of the various devices.

FIG. 4A represents system 400 with the stateful monitoring devices separate from the network used for communication in accordance with at least one of the various embodiment. In at least one of the various embodiments, client computer 402 may be arranged to communication over network 406 to server computer 404. Further, in some embodiments, network monitoring computer (NMC) 408 may be disposed between client computer 402 and network 406. Likewise, in some embodiments, another NMC, NMC 410, may be disposed between network 406 and server computer 404. Also, in system 400, in some embodiments, traffic management computer (TMC) 412 may be uninvolved (e.g., separate) from the network communication between client computer 402 and server computer 404.

In at least one of the various embodiments, NMCs, such as, NMC 408 and NMC 410, may be arranged to perform stateless network traffic management (e.g., routers). For example, NMC 408 and NMC 410 may be arranged to provide firewall services and/or provide network address translation (NAT) services, or the like.

In at least one of the various embodiments, TMC 412 may be arranged to provide stateful network traffic management of network flows that may include, packet inspection and stateful application of policies based on the network traffic communicated over a network flow. For example, in some embodiments, TMC 412 may be arranged to inspect the contents of incoming/outgoing network packets to determine whether the traffic complies with one or more traffic management policies. For example, TMCs may be arranged employ stateful network monitoring it may enforce policies that require certain types of packets to be delivered in a particular order for a given network flow. Also, in some cases, TMCs may be arranged to perform proxy services, content transformation, or the like, for network flows. In contrast, NMCs may be disabled from inspecting the contents of packets and/or applying stateful policies to the network flow traffic.

In at least one of the various embodiments, network 406, may represent one or more networks, such as, network 108 and/or wireless network 107. Also, in at least one of the various embodiments, NMCs and TMCs may be physically co-located on the same computer hardware, likewise, NMCs and TMCs may be virtualized as one or more virtual machines operating on one or more network computers. Further, in some embodiments, NMCs and/or TMCs may be compute instances in a cloud-based computing environment. Also, in some embodiments, one or more client computers, such as, client computer 402, and/or one or more server computers, such as, server computer 404, may be virtual machines running on the same or separate computers. And, in some embodiments, one or more client computers, such as, client computer 402, and/or one or more server computers, such as, server computer 404, may be compute instances in a cloud-based computing environment.

In FIG. 4A, system 400 is illustrated as employing stateless traffic management provided by NMC 408 and NMC 410, accordingly, while operating in this mode network traffic throughput may be optimal since the traffic is not being processed by the TMC. Likewise, the resources of the TMC may be applied to perform traffic management operations for other computers that may require the enhanced traffic management services that are available using the TMC.

In at least one of the various embodiments, one or more conditions may occur that make it advantageous to switch from stateless traffic management to stateful traffic management.

FIG. 4B illustrates system 400 arranged such that TMC 412 is engaged to provide stateful traffic monitoring/management for one or more of the network flows that communicate between client computer 402 and server computer 404. In at least one of the various embodiments, one or more automatic or manual conditions (operator input) may cause system 400 to begin to use TMC 412 to provide stateful traffic monitoring. For example, in some embodiments, NMC 408, or some other monitoring service, may detect anomalies and/or suspicious behavior that may be related to network traffic between client computer 402 and server computer 404.

Accordingly, in at least one of the various embodiments, the network traffic between NMC 408 and NMC 410 may be routed through TMC 412 to enable TMC 412 to perform stateful monitoring of the network traffic for one or more network flows of the communication between client computer 402 and server computer 404. As a result, TMC 412 may be better suited to employ advanced techniques to identify and/or mitigate malicious/suspicious network traffic than the NMCs.

In at least one of the various embodiments, there may be many ongoing/active network flow connections between client computer 402 and server computer 404. Even though the figure shows one client computer, one of ordinary skill in the art will appreciate that there may be many more. For example, in production environments, there may be many (e.g., 1000's; 100,000's; 1,000,000's; and so on) connections active at any one time. In some embodiments, since these active connections may have already communicated one or more network packets using various network protocols, the TMC may have difficulty establishing the correct or required state for the active network flow connections. For example, one or more handshake packets for a given network protocol may have already been exchanged before the TMC is provided the traffic of one or more active network flows. In such examples, the TMC may be unable to verify that the endpoints of the network flow have exchanged valid handshake messages.

In at least one of the various embodiments, TMC 412 may be arranged to let some or all of active network flows continue through to their destination unmolested since the state of the flows may be unknown to the TMC or difficult for the TMC to recreate. In some embodiments, active connection flows may be allowed to continue communicating without disruption for at least some period of time. In contrast, if the TMC resets and/or otherwise terminates the active connection flows, many users may have their communication disrupted.

Accordingly, in at least one of the various embodiments, if a new connection flow is initiated, the TMC may begin tracking (the state) the flow and begin applying one or more stateful traffic management policies to the flow. Thus, in some embodiments, the TMC may be arranged treat the previously active flows differently that the new connection flows that may be initiated after the TMC is engaged to provide stateful monitoring.

However, in at least one of the various embodiments, the previously active connections may be non-intrusively/passively monitored to collect various metrics associated with the previously active flows. In some embodiments, these metrics may be employed in traffic management policies used to determine if the previously active connection flows should be allowed to pass through unmolested. For example, in some embodiments, a policy rule may be defined to allow the previously active connection flows to continue to operate for a defined period of time (e.g., a time limit) after the traffic is switched to the TMC. In other examples, policies may be arranged to allow the previously active connection flows to communicate until the ratio of new state-fully monitored connection flows to statelessly monitored connection flows exceeds a defined threshold. One of ordinary skill in the art will appreciate the other criteria and/or combinations of criteria may be included in one or more traffic management policies or policy rules used to determine if the previously active connections may be allowed to communicate with their destinations. In at least one of the various embodiments, if based on one or more traffic management policies, one or more of the statelessly monitored connections are disallowed, they may be terminated and/or their associated network packets may be discarded.

Also, in at least one of the various embodiments, eventually the events that contributed to activating the stateful monitoring of connection flows may subside. Accordingly, the network communication may be transitioned back to being statelessly monitored so the TMC resources may be applied to other uses.

In at least one of the various embodiments, the reverse transition process may begin by assigning new connections to use stateless monitoring and continue tracking and inspecting currently active connection flows without disruption. In at least one of the various embodiments, if one or more criteria defined in the traffic management policies may be met, the remainder of statefully monitored connections may be reset or otherwise terminated.

Also, while the network communication paths in FIG. 4B are illustrated as bypassing network 406, TMC 412 is assumed to reachable over a public or private network. It is shown separately here to provide clarity by emphasizing that the TMC may be separated from the communication path between NMC 408 and NMC 410 if it is not performing stateful monitoring of the network traffic of their communications.

Generalized Operations

Figure 5:
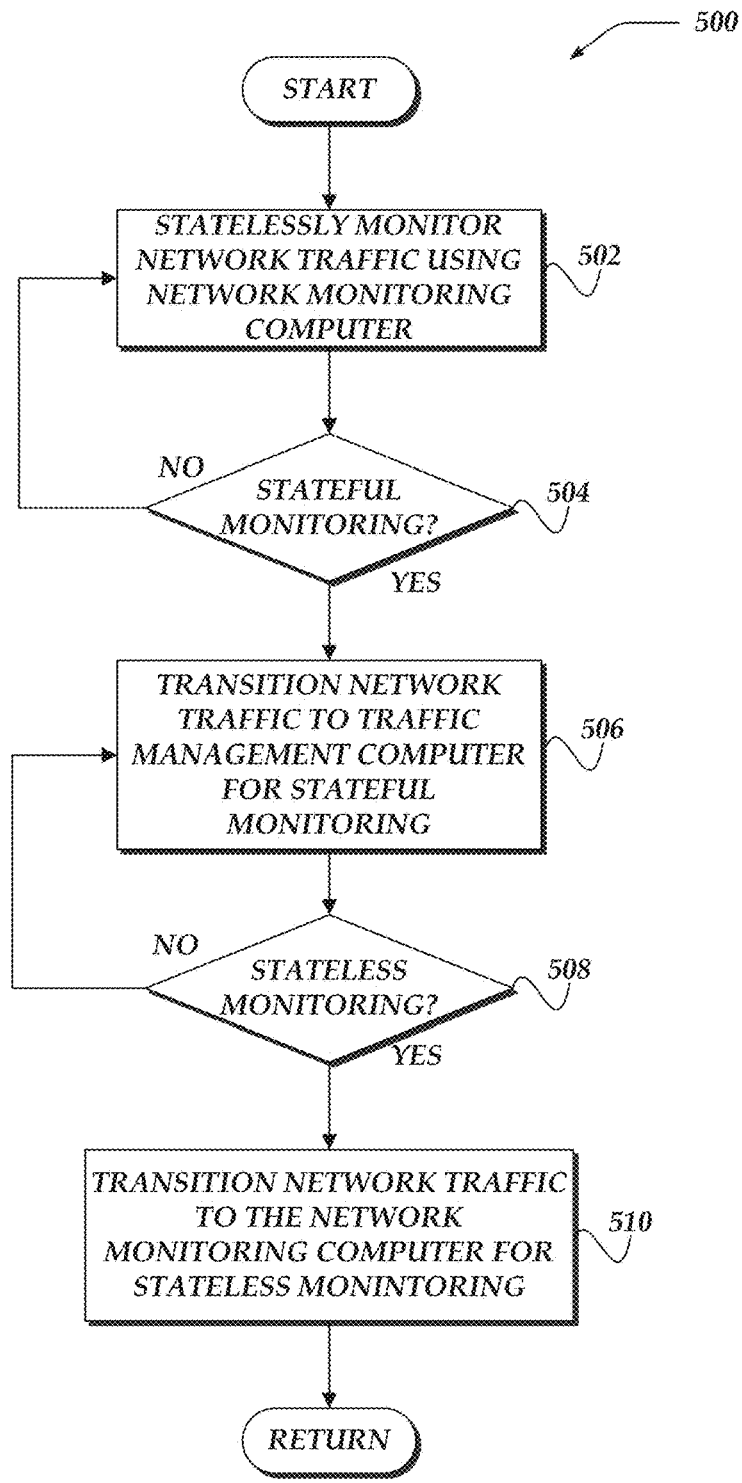
FIG. 5 illustrates an overview flowchart of a process for inserting and removing stateful in a network devices in accordance with at least one of the various embodiments.
Figure 6:
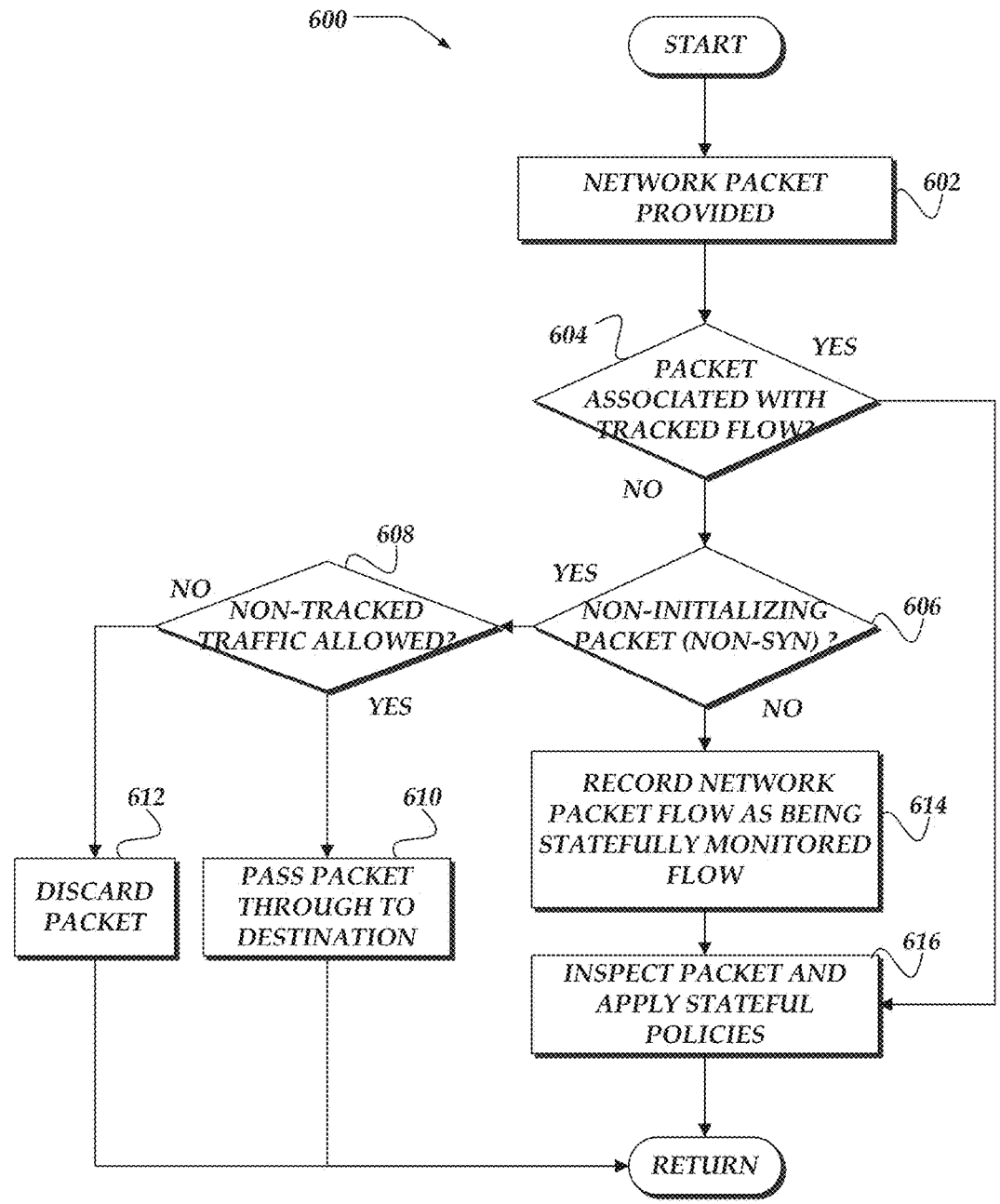
FIG. 6 illustrates an overview flowchart of a process for transitioning network traffic from stateless monitoring to stateful monitoring by a traffic management computer in accordance with at least one of the various embodiments.
Figure 7:
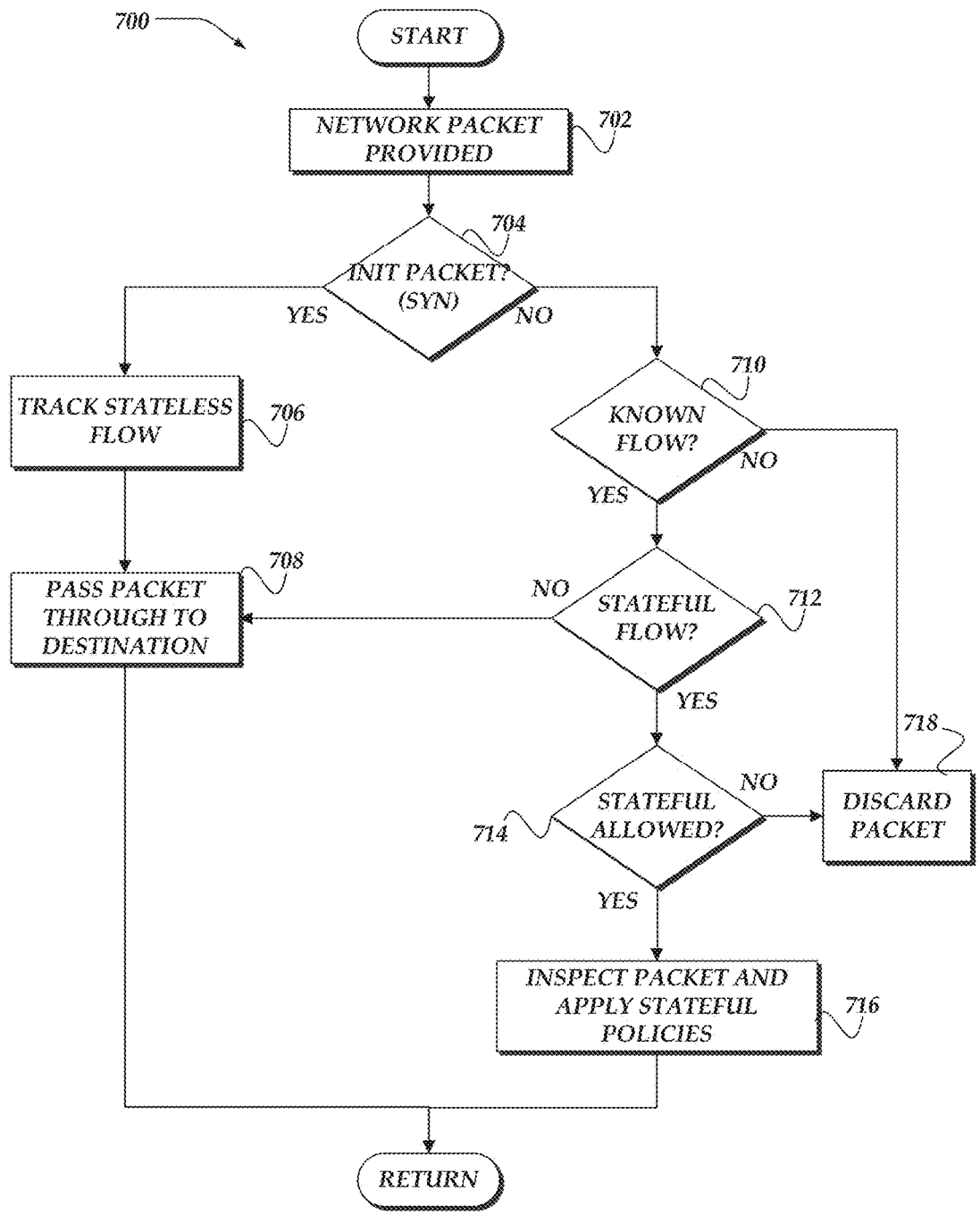
FIG. 7 illustrates an overview flowchart of a process for transitioning network traffic from stateful monitoring by a traffic management computer to stateless monitoring in accordance with at least one of the various embodiments.

FIGS. 5-7 represent the generalized operations for inserting and removing stateful devices in a network in accordance with at least one of the various embodiments. In at least one of the various embodiments, processes 500, 700, and 700 as described in FIGS. 5-7 may be implemented by and/or executed on a single TMC and/or network computer, such as network computer 300 of FIG. 3. In other embodiments, these processes or portions thereof may be implemented by and/or executed on a plurality of network computers, such as network computer 300 of FIG. 3, client computer 200 of FIG. 2, or the like. However, embodiments are not so limited, and various combinations of network computers, client computers, virtual machines, TMCs, or the like, may be utilized. Further, in at least one of the various embodiments, the processes described in conjunction with FIGS. 5-7 may be operative in traffic management computers, systems, and/or architectures, such as, those described in conjunction with FIGS. 1-4A and 4B.

FIG. 5 illustrates an overview flowchart of process 500 for inserting and removing stateful devices in a network devices in accordance with at least one of the various embodiments. After a start block, at block 502, in at least one of the various embodiments, network traffic may be monitored using one or more stateless network monitoring computers. As described in FIG. 4A-4B, client computers and server computers may be arranged to communicate over network. One of network monitoring computers (e.g., firewalls, NATs, switches, routers, or the like) may be performing stateless monitoring and subsequent traffic management on the some or all of the communication between the client computers and the server computers.

At decision block 504, in at least one of the various embodiments, if stateful monitoring is enabled, control may flow to block 506; otherwise, control may loop back to block 502. In at least one of the various embodiments, one or more NMCs may be arranged to signal a change from stateless monitoring to stateful monitoring. In some embodiments, one or more policy rules, events, conditions, or criteria that may trigger the transition to stateful monitoring may be defined using configuration information. For example, if an NMC detects that network traffic has increased above a defined threshold, it may be configured to initiate a transition to stateful monitoring.

In at least one of the various embodiments, other monitoring systems that may be monitoring the quality of service and/or performance of the server computers and/or one or more of their applications, may be arranged to initiate a transition to stateful monitoring if one or more defined metrics are exceeded. In some embodiments, metrics may include use of resources (e.g., CPU, storage, memory, network bandwidth, or the like) that exceed a defined threshold. Also, in at least one of the various embodiments, a reduction in the use of resources or application utilization may trigger a transition to stateful monitoring. For example, if a regularly used database application unexpectedly stops receiving service requests, it may indicate that there may be a malicious attack on another part of the system. Accordingly, for this example, the system may transition to using stateful monitoring to mitigate the suspected attack.

Also, in at least one of the various embodiments, an operator may be enabled to direct the network to begin using stateful monitoring based on direct or indirect observations of anomalies, customer reports, errors, or the like, or combination thereof.

At block 506, in at least one of the various embodiments, the network traffic may be transitioned to one or more traffic management computers for stateful monitoring. In at least one of the various embodiments, various techniques may be employed to direct the network traffic to one or more TMCs that may be capable of providing stateful monitoring. For example, network routing information may be modified to direct the network flows to aTMC. In some embodiments, the routing of the network traffic to the TMC may be transparent to the client computers and/or server computers. For example, as FIG. 4B illustrates, the one or more TMCs may be 'inserted' in between the NMCs that are statelessly monitoring the network traffic. In other embodiments, the modification of the network routes may be arranged to bypass one or more of the NMCs and have the TMC become the connection endpoint(s).

Also, in at least one of the various embodiments, the stateless monitoring of network traffic may be occurring on a TMC that may also perform the stateful monitoring. Accordingly, in some embodiments, the modification to network traffic routes may be internal to the TMC.

In at least one of the various embodiments, the details of the stateful monitoring may be determined by one or more rule based policies (e.g., policy rules) that may be applied by the one or more TMCs. Such policies may be include taking actions such as deep packet inspection, endpoint proxying, one or more cryptographic operations (e.g., decrypting encrypted traffic so it may be inspected, or the like).

In at least one of the various embodiments, stateful policies may be arranged to monitor the type of network packets that are received and the order they may be received. Accordingly, the TMC may be enabled to determine if the network flows are conforming to various requirements of the communication protocols they are using. For example, if a communication protocol has a three-step handshake, the stateful monitoring may enable the identification of network flows that are not properly performing the handshake required by the protocol. Then, for example, the TMC may take actions such as blocking or terminating the bad acting network flows.

At decision block 508, in at least one of the various embodiments, if stateless monitoring is re-enabled, control may flow to block 510; otherwise, control may loop back to block 506. In at least one of the various embodiments, sometime after stateful monitoring is initiated the reason for transitioning from stateless monitoring to stateful monitoring may have subsided. In some embodiments, the stateful monitoring may enabled the TMC to mitigate the issue(s) that may have triggered the transition. In some cases, the stateful monitoring may have confirmed that the condition that triggered the transition is not malicious. In any event, the TMC may be configured to use one or more rule based policies (e.g., policy rules) to determine that it is time to transition from stateful monitoring back to stateless monitoring. For example, if a suspected denial of service attack prompted the transition to stateful monitoring, if the denial of service attack subsides, the system may begin to transition from stateful monitoring back to stateless monitoring.

In at least one of the various embodiments, various metrics collected by the TMC and/or other services may be employed in rule based policies that may trigger the transition back to stateless monitoring. For example, if the number of non-conforming network flows drops below a define threshold and/or a defined ratio (to conforming flows), the TMC may be arranged to begin the transition from stateful monitoring to stateless monitoring.

At block 510, in at least one of the various embodiments, network traffic may be transitioned back to stateless monitoring. In at least one of the various embodiments, as describe in more detail below, the one or more TMC may be arranged to perform actions to transition from stateful monitoring to stateless monitoring such that disruption of service may be reduced or minimized. In at least one of the various embodiments, the TMCs may be arranged to continue statefully monitoring current flows while using stateless monitoring on new network flows. After one or more conditions are met, the TMC may reset and/or terminate remaining statefully monitored network flows.

Further, in at least one of the various embodiments, various techniques may be employed to direct the network traffic back to the one or more NMCs to continue providing stateless monitoring of the network flows. For example, routing information may be modified to direct the network flows away from the TMC. In some embodiments, the routing of the network traffic away from the TMC may be transparent to the client computers and/or server computers.

For example, as FIG. 4A illustrates, the one or more TMCs may be separated from the network communication between the NMCs. Accordingly, the NMCs may take over the stateless monitoring of the network traffic. Also, in at least one of the various embodiments, the stateless monitoring of network traffic may be arranged to occur on the same TMC that performed the stateful monitoring. Accordingly, in some embodiments, the modification to network traffic routes may be internal to the TMC. Next, control may be returned to a calling process.

FIG. 6 illustrates an flowchart of process 600 for transitioning network traffic from stateless monitoring to stateful monitoring by a traffic management computer in accordance with at least one of the various embodiments. After a start block, in at least one of the various embodiments, at block 602, a network packet may be provided and/or received.

At decision block 604, in at least one of the various embodiments, if the network packet is associated with a tracked network flow, control may flow to decision block 606. In at least one of the various embodiments, a tracked network flow in this case may be a network flow that is being statefully monitored by a traffic management computer (TMC). In at least one of the various embodiments, the TMC may be arranged to employ one or more identifying characteristics of the network packet, such as, its tuple information, for associating the network packet with a particular network flow. Accordingly, the TMC may be arranged to maintain a list and/or table of network flows that are currently being monitored using stateful monitoring. Thus, in at least one of the various embodiments, the TMC may compare the characteristics of the provided network packet to determine if there is a network flow that is currently being statefully monitored that is associated with the network packet.

At decision block 606, in at least one of the various embodiments, if the network packet is a non-initializing packet, control may flow to decision block 608; otherwise, control may flow to block 614. In at least one of the various embodiments, if the network packet is not indicative of a beginning of a new connection and/or network flow, it may be a network packet that may be associated with one of the network flows that was being statelessly monitored before the transition to stateful monitoring. For example, new TCP/IP connections that are established after the switch to stateful monitoring may be initialized by a network packet that includes a SYN message.

At decision block 608, in at least one of the various embodiments, if non-statelessly monitored traffic is allowed, control may flow to block 610; otherwise, control may flow to block 612. In at least one of the various embodiments, since the provided network packet is associated with a network flow that is not being statefully monitored, the TMC may be enabled to pass it through to its destination unmolested. However, in at least one of the various embodiments, the TMC may be arranged to employ one or more rule based policies to determine if network packets for the statelessly monitored flow may be allowed to pass. In at least one of the various embodiments, the criteria for allowing the statelessly monitored network flows to pass traffic is satisfied the traffic may be passed, otherwise, the traffic may be discarded or stored for forensic analysis at a later time. Likewise, in some embodiments, the TMC may be arranged to employ rule based policies that examine criteria for determining if network traffic associated with the statelessly monitored network flows should be discarded.

In at least one of the various embodiments, such criteria may include timers/time limits, a ratio of statefully monitored network flows to statelessly monitored network flows, or the like, or combination thereof. For example, a rule based police may define a 60 second time limit duration which statelessly monitored network traffic may be allowed.

At block 610, in at least one of the various embodiments, since the network traffic is associated with a statelessly monitored network flow, it may be passed through to its destination unmolested. In at least one of the various embodiments, the TMC may be arranged to perform stateless/passive monitoring of the network traffic, such as, ensuring that its origin or destination is allowed and not blacklisted, that flow is using allowed ports, or the like, or combination thereof.

At block 612, in at least one of the various embodiments, since the TMC is disabling stateless network flows, the network packet may be discarded or otherwise ignored. In some embodiments, the TMC may determine that the network flow is one that was active before the transition to stateful monitoring, in such cases, the TMC may be arranged to communicate a reset or termination message to the originator of the network traffic. For example, the TMC may maintain a list or table of tuple information associated with the statelessly monitored network flows that may be transferred from one or more network monitoring computers. Accordingly, in this example, the TMC may compare the tuple information of the network packet with the stored tuple information of the transferred statelessly monitored connections to determine if the network packet is associated with a transferred network flow. Next, control may be returned to a calling process.

At block 614, in at least one of the various embodiments, the network flow associated with the network packet may be recorded as being statefully monitored. In at least one of the various embodiments, the tuple information associated with the provided network packet may be stored in a list or table to indicate that other packets having the same tuple information may be statefully monitored by the TMC.

At block 616, in at least one of the various embodiments, the TMC may be arranged to inspect the network packet and/or otherwise apply one or more stateful policies the network packet. In some embodiments, the network packet may indicate that the connection associated with network flow is ending. Accordingly, in at least one of the various embodiments, the TMC may be arranged to remove the network flow (and its tuple information) from the list and/or table of statefully monitored network flows. Next, control may be returned to a calling process.

FIG. 7 illustrates a flowchart of process 700 for transitioning network traffic from stateful monitoring by a traffic management computer to stateless monitoring in accordance with at least one of the various embodiments. After a start block, in at least one of the various embodiments, at block 702, a network packet may be provided to the TMC.

At decision block 704, in at least one of the various embodiments, if the provided network packet is a connection initialization packet, such as, a TCP/IP SYN packet, control may flow block 706; otherwise, control may flow to decision block 710. In at least one of the various embodiments, the TMC may be arranged to transition back to stateless monitoring before handing some or all of the network connection to a network monitoring computer that does stateless monitoring.

In at least one of the various embodiments, the transition to stateless monitoring from stateful monitoring may be similar the transition from stateful to stateless as describe above. Accordingly, new network flows may be assigned to stateless monitoring while active network flow currently being statefully monitored may continue to be statefully monitored (for a sometime at least).

At block 706, in at least one of the various embodiments, the TMC may be arranged to record that the network flow associated with the network packet should be monitored statelessly. In at least one of the various embodiments, the TMC may be arranged to extract the tuple information from the provided network packet and store it with the network flow information in a list or table. Other, information such as performance metrics/counters or the like may also be associated with the network flow. In some embodiments, other information in addition to and/or in lieu of the tuple information may be used, for example one or more header fields of the network packet may be employed to generate fingerprint information that may be used to associate network packets with the network flow.

At block 708, in at least one of the various embodiments, since the network flow associated with the network packet is designated for stateless monitoring, it may be communicated to its endpoint as per normal TMC operations. For example, the TMC may forward the network packet to its next destination based on its included destination address information.

In at least one of the various embodiments, the TMC may perform some non-intrusive monitoring such as packet counting, latency tracking, or the like. In some embodiments, the TMC may be arranged to refrain from performing packet transformations, or re-routing of the packet based on rules. In at least one of the various embodiments, after the network packet is forwarded to its next destination, control may be returned to calling process.

At decision block 710, in at least one of the various embodiments, if the network flow associated with the network packet is a known network flow, control may flow to decision block 712; otherwise, control may flow to block 718.

In at least one of the various embodiments, known flows may include stateless network flows that have connected since the transition from stateful monitoring to stateless monitoring was initiated. Also, in at least one of the various embodiments, known network flows may include one or more statefully monitored network flows that were being statefully monitored before the transition from stateful monitoring to stateless monitoring started.

In at least one of the various embodiments, one or more characteristics of the network packets (including its content) may be employed to identify the network flow of the network packet. As discussed above, the tuple information of the network packet and/or other information of the packet may be employed for associating provided network packets with a network flow.

At decision block 712, in at least one of the various embodiments, if the network packet is associated with a statefully monitored network flow, control may flow to block 718; otherwise, control may flow to block 708 (described above). In at least one of the various embodiments, the characteristics of the network packet (e.g., its tuple information) may be employed to determine which known network flow the network packet may be associated with. Accordingly, the TMC may determine if the network flow is designated for stateful monitoring or stateless monitoring.

At decision block 714, in at least one of the various embodiments, if the stateful monitoring is still allowed, control may flow to block 716; otherwise, control may flow to block 718. Similar, as described in for decision block 608 in FIG. 6, the TMC may be arranged to determine if the network packets of the statefully monitored flow may be allowed. Accordingly, in at least one of the various embodiments, one or more criteria may be defined in one or more policy rules for determining if the statefully monitored network flows should be allowed to continue communicating.

In at least one of the various embodiments, such criteria may include, timers/time limits, ratio of statelessly monitored network flows to statefully monitored network flows, or the like, or combinations thereof.

At block 716, in at least one of the various embodiments, since the network packet may be associated with a statefully monitored network flow, the TMC may be arranged to inspect the network packet contents and/or otherwise apply one or more stateful polices the network packet. Next, control may be returned to a calling process.

At block 718, in at least one of the various embodiments, since the network packet is associated with an unknown network flow, or a statefully monitored network flow received while the stateful monitoring is disabled, the network packet may be discarded or stored for later forensic analysis.

In at least one of the various embodiments, if the network packet is associated with a known network flow, the TMC may be arranged to send a reset and/or termination message to the originator of the network packet to enable them to reestablish a connection that uses a statelessly monitored network flow. Next, control may be returned to a calling process.

In at least one of the various embodiments, the TMC may be configured to perform additional operations with respect the network packets received for unknown flow, such as, blacklist the originator address, or the like. The particular operations may be determined using one or more rule based policies that may be applied to the network packet and its associated network flow.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing network communication that is executed by one or more traffic management computers (TMCs) with one or more processors to perform actions comprising:
employing network traffic that is statelessly monitored to be selected for stateful monitoring based one or more policies for non-conforming with network communication protocols to perform operations including:
receiving the network traffic, wherein the network traffic includes one or more network packets;
employing the one or more network packets that are selected for stateful monitoring by the one or more TMCs to perform one or more stateful network management operations on the one or more network packets; and
employing the stateful monitoring of the one or more network packets to be transitioned back to stateless monitoring when an amount of network flows that conform to one or more associated network communication protocols is below a threshold, wherein the transition to stateless monitoring performs one or more stateless network management operations on the one or more network packets associated with the monitored network traffic.

2. The method set forth in claim 1, wherein one or more of the processors are the same processor.

3. The method set forth in claim 1, wherein one or more of the processors are on the same TMC.

4. The method set forth in claim 1, wherein the one or more stateless network management operations, further comprise, when the one or more network packets are determined to be initializing-packets of a network protocol, start stateful monitoring of the one or more network packets.

5. The method set forth in claim 1, wherein the one or more stateless network management operations, further comprise, discarding the one or more network packets.

6. The method set forth in claim 1, wherein the one or more stateless network management operations, further comprise, forwarding the one or more network packets to their destination.

7. The method set forth in claim 1, further comprising, when network traffic that is statefully monitored is selected for stateless monitoring, performing one or more network management operations that route the network traffic to one or more network monitoring computers for stateless monitoring.

8. A processor readable non-transitory storage media that includes instructions for managing network communications, wherein execution of the instructions by one or more processors performs actions comprising:
employing network traffic that is statelessly monitored to be selected for stateful monitoring based one or more policies for non-conforming with network communication protocols to perform operations including:
receiving the network traffic, wherein the network traffic includes one or more network packets;
employing the one or more network packets that are selected for stateful monitoring by the one or more TMCs to perform one or more stateful network management operations on the one or more network packets; and
employing the stateful monitoring of the one or more network packets to be transitioned back to stateless monitoring when an amount of network flows that conform to one or more associated network communication protocols is below a threshold, wherein the transition to stateless monitoring performs one or more stateless network management operations on the one or more network packets associated with the monitored network traffic.

9. The media set forth in claim 8, wherein one or more of the processors are the same processor.

10. The media set forth in claim 8, wherein one or more of the processors are on a same TMC.

11. The media set forth in claim 8, wherein the one or more stateless network management operations, further comprise, when the one or more network packets are determined to be initializing packets of a network protocol, start stateful monitoring of the one or more network packets.

12. The media set forth in claim 8, wherein the one or more stateless network management operations, further comprise, discarding the one or more network packets.

13. The media set forth in claim 8, wherein the one or more stateless network management operations, further comprise, forwarding the one or more network packets to their destination.

14. The media set forth in claim 8, further comprising, when network traffic that is statefully monitored is selected for stateless monitoring, performing one or more network management operations that route the network traffic to one or more network monitoring computers for stateless monitoring.

15. A traffic management computer (TMC) comprising:
a memory comprising instructions stored in the memory; and
one or more processors that execute the instructions to perform actions, comprising:
employing network traffic that is statelessly monitored to be selected for stateful monitoring based one or more policies for non-conforming with network communication protocols to perform operations including:
receiving the network traffic, wherein the network traffic includes one or more network packets;
employing the one or more network packets that are selected for stateful monitoring by the one or more TMCs to perform one or more stateful network management operations on the one or more network packets; and
employing the stateful monitoring of the one or more network packets to be transitioned back to stateless monitoring when an amount of network flows that conform to one or more associated network communication protocols is below a threshold, wherein the transition to stateless monitoring performs one or more stateless network management operations on the one or more network packets associated with the monitored network traffic.

16. The traffic management computer set forth in claim 15, wherein one or more of the processors are a same processor.

17. The traffic management computer set forth in claim 15, wherein the one or more stateless network management operations, further comprise, when the one or more network packets are determined to be initializing packets of a network protocol, start stateful monitoring of the one or more network packets.

18. The traffic management computer set forth in claim 15, wherein the one or more stateless network management operations, further comprise, discarding the one or more network packets.

19. The traffic management computer set forth in claim 15, wherein the one or more stateless network management operations, further comprise, forwarding the one or more network packets to their destination.

20. The traffic management computer set forth in claim 15, further comprising, when network traffic that is statefully monitored is selected for stateless monitoring, perform one or more network management operations that route the network traffic to one or more network monitoring computers for stateless monitoring.

* * * * *